US005799383A

United States Patent [19]

Baldwin et al.

[11] Patent Number: 5,799,383

[45] Date of Patent: Sep. 1, 1998

[54] SELF ADJUSTING HOSE CONNECTOR CRIMPING APPARATUS AND METHOD OF USE

[75] Inventors: Arden E. Baldwin, East Peoria; William G. Clelland, III, Brimfield; John Styfhoorn, Dunlap, all of Ill.

[73] Assignee: Caterpillar Inc., Peoria, Ill.

[21] Appl. No.: 886,858

[22] Filed: Jul. 1, 1997

[51] Int. Cl.[6] .................................................... B23Q 17/00

[52] U.S. Cl. .......................... 29/407.05; 29/508; 29/516; 29/237

[58] Field of Search ............................ 29/407.05, 407.01, 29/508, 516, 237, 282, 283.5; 72/21.3, 402

[56] References Cited

U.S. PATENT DOCUMENTS

| | | | |
|---|---|---|---|
| 4,205,427 | 6/1980 | Koch et al. | 29/568 |
| 4,953,383 | 9/1990 | Stiver | 72/402 |
| 4,987,765 | 1/1991 | Nishimura et al. | 72/405 |
| 5,005,277 | 4/1991 | Uemura et al. | 29/407 |
| 5,036,690 | 8/1991 | McGowen et al. | 72/49 |
| 5,337,589 | 8/1994 | Gloe et al. | 72/11 |

*Primary Examiner*—David P. Bryant

*Attorney, Agent, or Firm*—O. Gordon Pence; Robert E. Muir

[57] ABSTRACT

An apparatus for crimping connectors on the ends of hoses includes a clamping machine having first and second moveable portions, a first measuring device associated with the clamping machine for delivering a signal representative of the linear distance between the moveable portions, and a controller operatively connected to the first measuring device and the clamping machine, for receiving the signal and stopping the relative movement of the first and second moving portions when the signal reaches a predetermined setting. The controller adjusts the relative movement of the moveable portions in response to input recorded on crimped connectors.

10 Claims, 4 Drawing Sheets

PRIOR ART

SELF ADJUSTING HOSE CONNECTOR CRIMPING APPARATUS AND METHOD OF USE

TECHNICAL FIELD

The present invention relates generally to an apparatus for metal deforming, and more particularly to an apparatus with randomly-actuated stopping with use of control means, and a method for performing the same.

BACKGROUND ART

Crimping machines, together with associated crimping dies, pusher assemblies, and controllers are used in those applications where an evenly-distributed, circumferentially applied force is needed to reduce the diameter of a workpiece without radial distortion. In order to provide an evenly distributed, circumferentially applied force, crimping machines conventionally employ crimping dies which are disposed around the workpiece, and have a curved inside surface adjacent the workpiece which substantially matches the curvature of the workpiece. A ram and driving means are provided to apply a pressing force to the crimping die through a pusher assembly, the pusher assembly being provided to control the amount of the crimp and to assure that the pressing force of the ram are applied evenly to the die assembly. Means are provided for translating the linear forces of the ram into radially applied forces on the crimping die, causing the die to move uniformly to reduce the diameter of the workpiece.

Because of the large variety of sizes and types of workpieces that require crimping, prior art crimping devices require a large number of crimping dies, die holders, pusher assemblies and means by which the operator controls the pressure applied to the workpiece in the crimping operation or means by which the operator optically or mechanically determines the end of the crimping operation.

U.S. Pat. No. 4,953,383, issued Sep. 4, 1990 to Stiver, et al., teaches a crimping device with crimping means and stop means, and with moving means and adjusting means for adjusting the crimping means in predetermined relationships to die means. The moving means and adjusting means cooperate such that when the crimping means is moved into engagement with the stop means by the moving means, the coupling is crimped to the hose end in accordance with the predetermined relationship. Also taught is an adjusting ring and calibrating ring for mechanically adjusting the crimping device to maintain crimping diameters in accordance with a table of predetermined relationships. This requirement of operator-based mechanical inputs for adjusting and calibrating the crimping device to account for individual hose coupling type and size, and to account for constituent component wear, may lead to high scrap rates and relatively slow operation.

The present invention is directed to overcoming one or more of the problems set forth above.

DISCLOSURE OF THE INVENTION

In accordance with the present invention there is provided a hose connector crimping apparatus for crimping connectors on the ends of hoses. The apparatus includes a clamping machine having first and second portions moveable relative to each other, a conical-shaped die holder on one of the portions, a conical-shaped split die mated with the die holder, and means for moving the portions toward each other to cause relative movement of the die and die holder to move the die vertically and horizontally. A first measuring device associated with the clamping machine is included for delivering a signal representative of the linear distance between the first and second portions. A controller is operatively connected to the first measuring device and the clamping machine, for receiving the signal and stopping the relative movement of the first and second moving portions of the clamping machine when the signal reaches a predetermined setting.

In another aspect of the invention there is provided a method for crimping a connector onto a hose end whereby the crimped connector diameter is maintained within acceptable limits. The method includes the steps of inputting a controller of a clamping machine with a relative limit distance between first and second portions of the clamping machine; assembling a connector and a hose end in a conical-shaped die supported on one of the first and second portions in preparation for crimping the connector upon the hose end; and operating the clamping machine so that the first and second portions move towards each other thereby compressing the conical-shaped die. The compressing action is stopped in response to a signal from a first measuring device operatively connected to the controller.

BRIEF DESCRIPTION OF THE DRAWINGS

Reference is made to the drawings which illustrate one embodiment of the invention and one apparatus for performing the claimed method, and wherein:

BEST MODE FOR CARRYING OUT THE INVENTION

Figure 1:
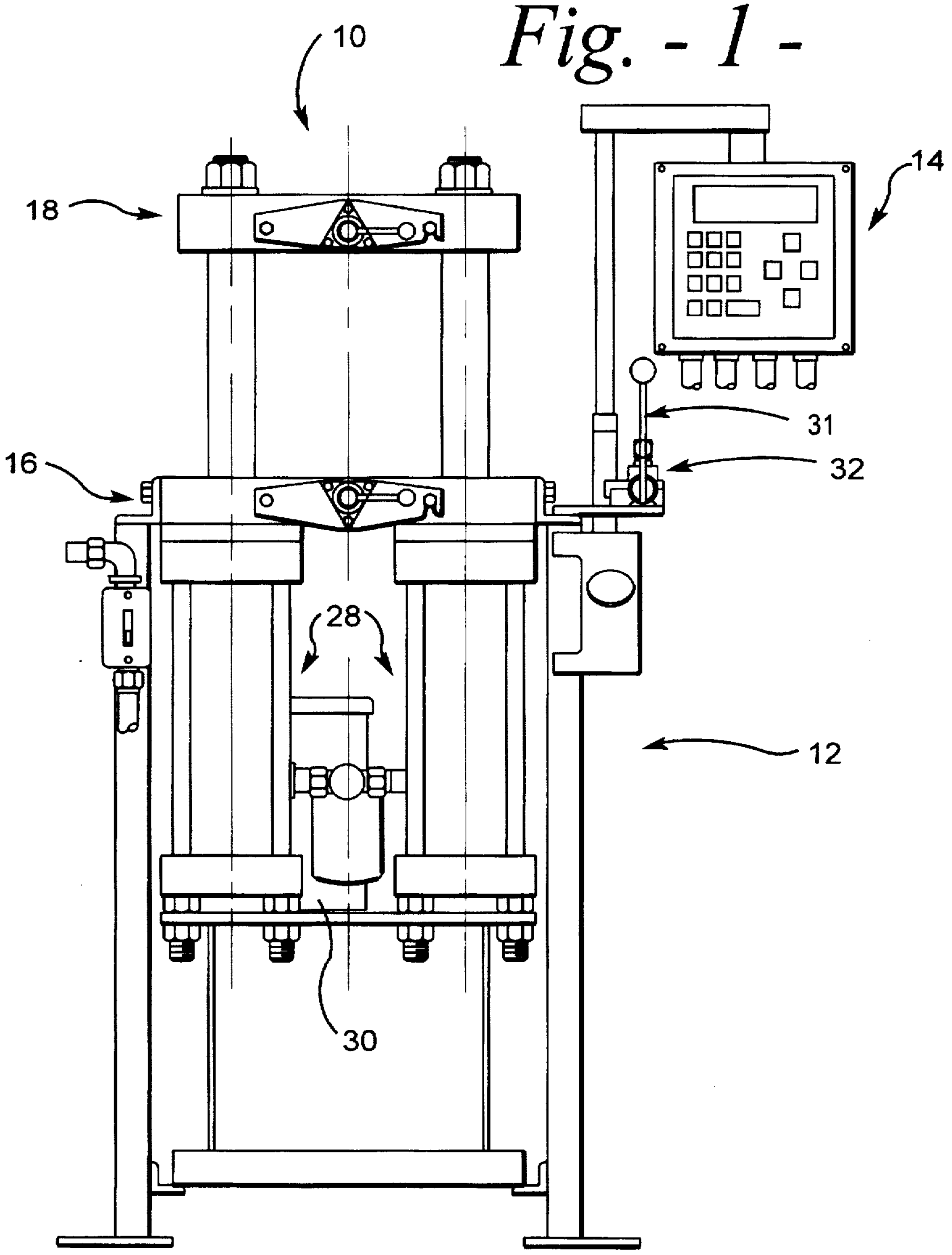
FIG. 1 is a diagrammatic front view of a hose connector crimping apparatus including a controller.
Figure 2:
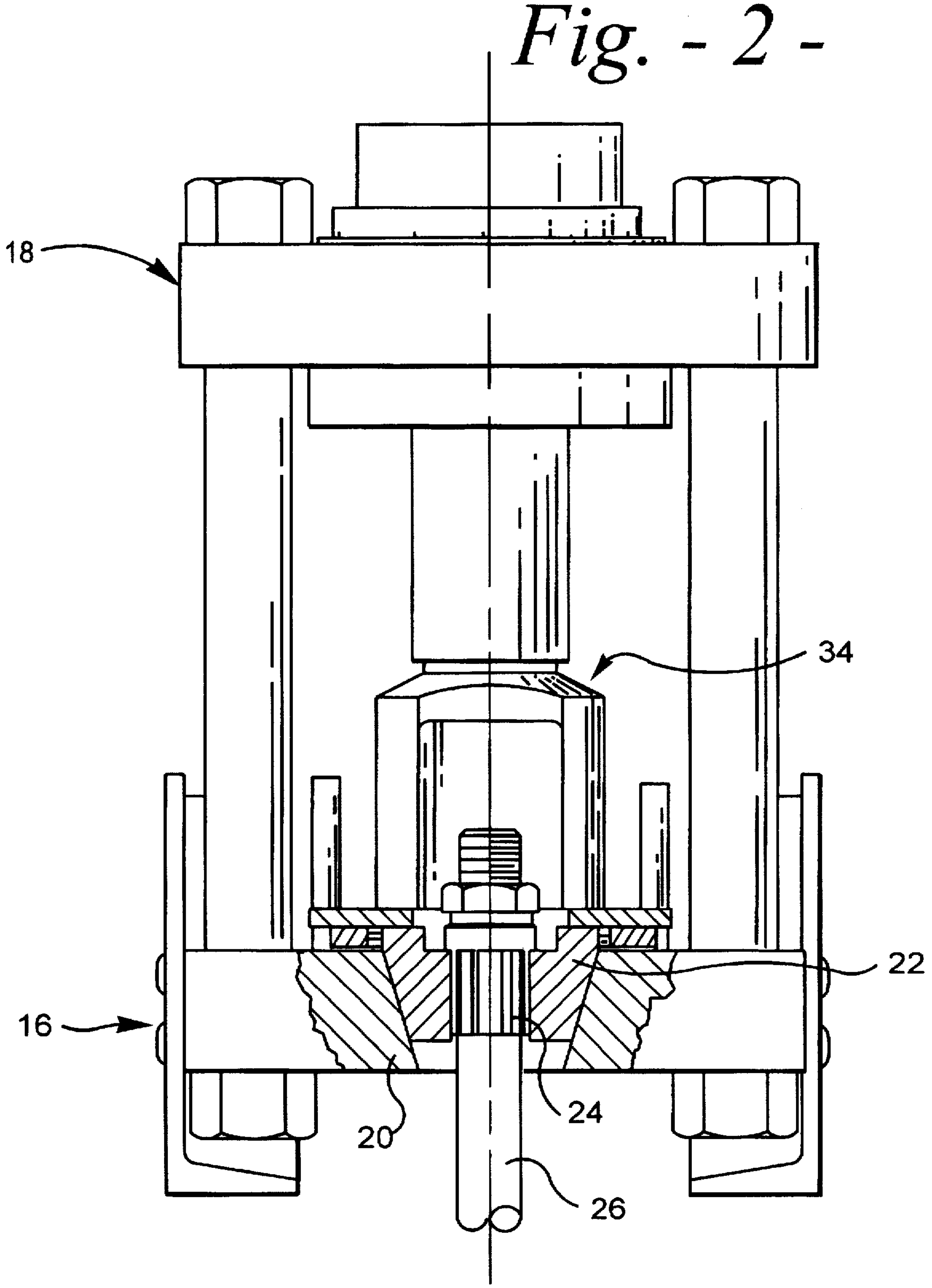
FIG. 2 is a view partly elevational and partly sectional, of a prior art device.
Figure 3:
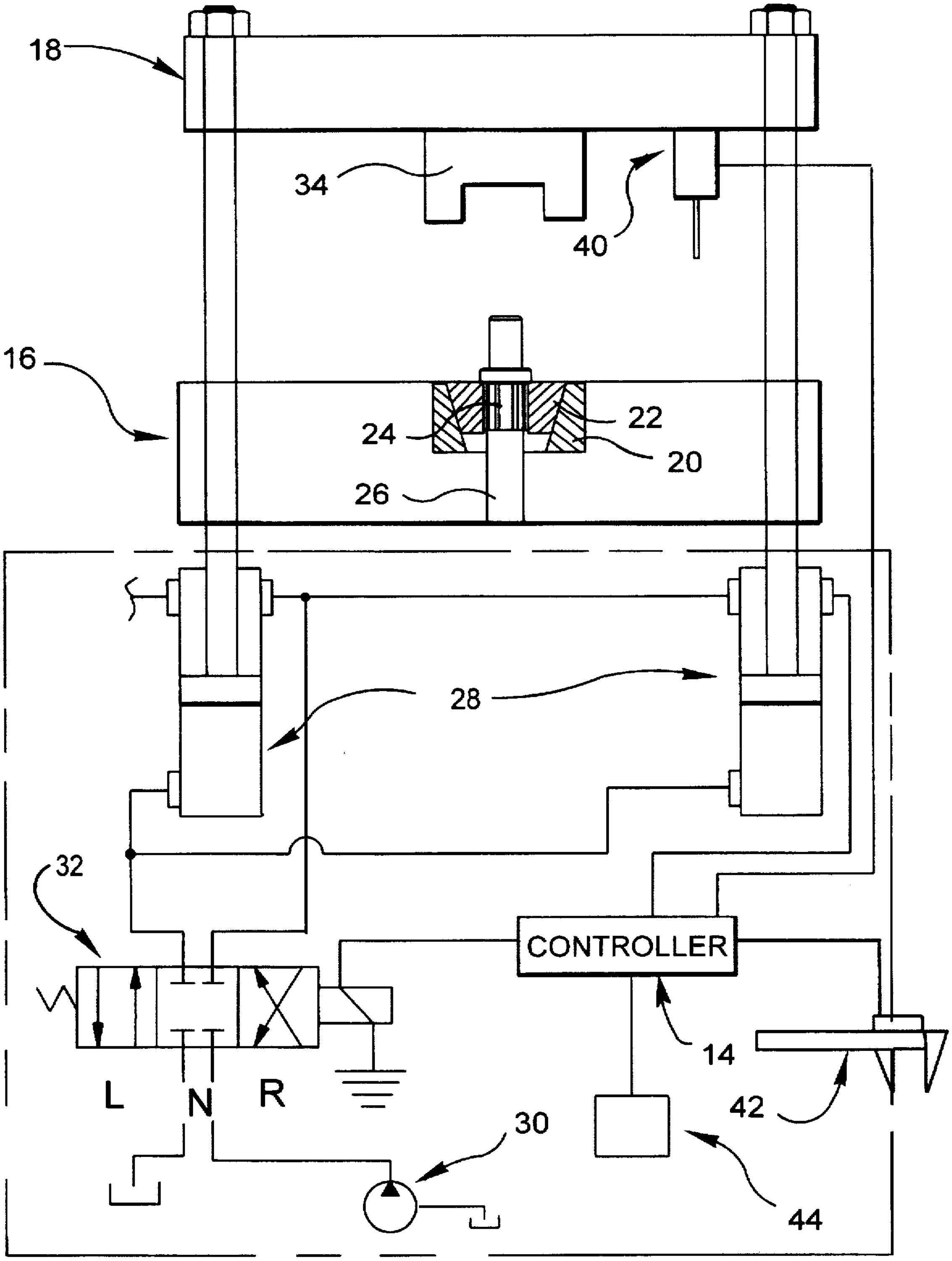
FIG. 3 is a diagrammatic schematic of the hose connector crimping apparatus showing the clamping machine, the controller and a measuring device.

In FIGS. 1, 2 and 3, a hose connector crimping apparatus 10 for crimping a connector 24 on the end of a hose 26 includes a clamping machine 12, such as the 70 ton combination hose assembly machine produced by Engineered Sales Inc. of St. Louis, Mo., and a controller 14, such as the model 140-2845 controller produced by Illini Technology Inc. of Springfield, Ill. Clamping machine 12 has first and second portions 16,18. While the following components of clamping machine 12 may be mounted on either first portion 16 or second portion 18, as shown herein a die fixture 34 is advantageously attached to second portion 18, a conical-shaped die holder 20 to first portion 16 and a conical-shaped split die 22 is mated to die holder 20. A pair of hydraulic rams 28,28, driven by hydraulic motor 30, are connected to first and second portions 16,18 and cause second portion 18 to move relative to first portion 16 in response to operator input at hydraulic ram control valve 32. Die 22 and die holder 20 move vertically in response to the clamping or releasing movement of die fixture 34 through portions 16,18, while die 22 moves also horizontally inside die holder 20 upon being compressed or uncompressed by die fixture 34.

FIG. 3 shows a first measuring device 40, such as a linear potentiometer, attached to portion 18 and connected to controller 14; however, the device 40 could be on portion 16 if desired. First measuring device 40 delivers a signal to controller 14 representative of the linear distance between portions 16,18. Controller 14 stops the relative movement between portions 16,18 in response to a signal from first measuring device 40 once the signal reaches a predetermined setting corresponding to a particular hose 26 type and size. A second measuring device 42, such as a digital caliper as is well-known in the industry, is operatively connected to controller 14 and reports measured diameters of crimped connectors 24 thereto, as is later described. Controller 14 compares the measured diameters to a database of predetermined nominal connector diameters and calculates a differential magnitude. If the differential magnitude is out-of-tolerance, controller 14 adjusts the relative movement of first and second portions 16,18 according to the die 22 type and the hose 26 size and type. A foot pedal device 44 signals the controller 14 to record an output from second measuring device 42. Controller 14 has a menu-driven set of operator communications for simplifying the crimping process as is described below.

Industrial Applicability

Figure 4:
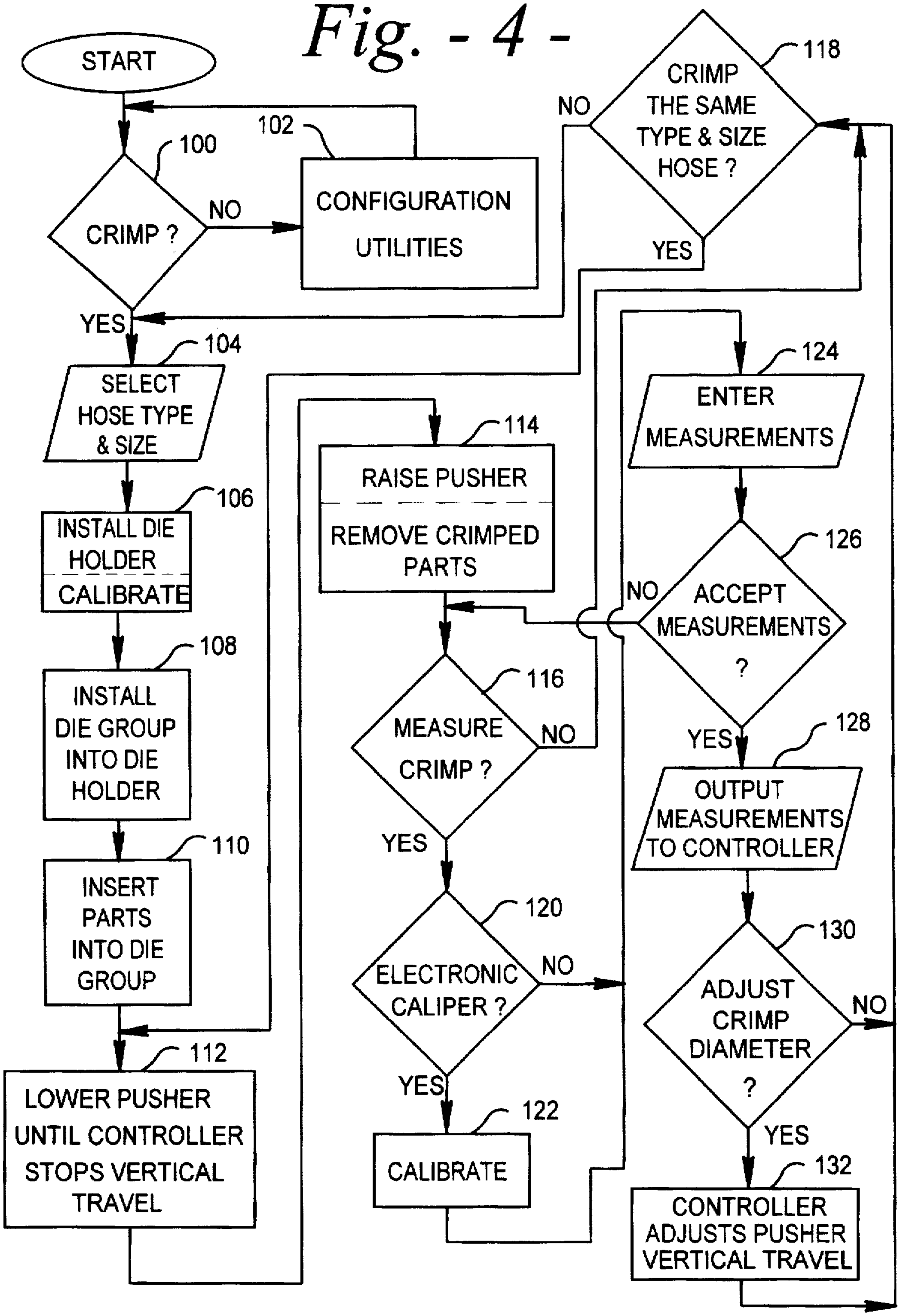
FIG. 4 is a flow chart showing the operating logic and the steps for performing the method.

In FIG. 4 and with reference to FIGS. 1 and 3, a flow chart of operator communications illustrates the logic associated with operation of hose connector crimping apparatus 10. In a decision box 100, the operator is asked if he wishes to commence a crimping operation. If the choice is "no", as is shown in step 102, a series of configuration utilities is presented. If the choice is "yes", the operator selects from a menu of hose 26 types and sizes, as is shown in input box 104.

As indicated in step 106, the operator is next instructed to install a particular die holder 20 into first portion 16, the type of die holder 20 being based upon the selection made at an input box 104. The operator then calibrates the relative vertical positions of first and second portions 16,18 by lowering second portion or pusher 18 until die fixture 34 seats upon first portion 16 and die holder 20.

As indicated at step box 108, after raising second portion 18, the operator installs a particular die or die group 22 into die holder 20 based upon the input hose 26 type and size. At step 110, the operator next inserts hose 26 and connector 24 into die group 22. At step 112, the operator lowers pusher 18 by moving lever 31 on hydraulic ram control valve 32. The lowering of pusher 18 is stopped by controller 14 at a predetermined setting, which is a function of hose 26 type and size.

At step 114, the operator then raises pusher 18 and removes assembled hose 26 and crimped connector 24. At decision box 116, the operator is asked whether he wishes to measure the crimped connector 24. If he chooses "no", he is presented with a decision box 118 inquiring whether he wishes to crimp the same type and size hose 26 and connector 24. If the answer to box 118 is "no", the operator is returned to input box 104. If the answer to decision box 118 is "yes", the operator is returned to step 112.

If the operator answers "yes" to decision box 116, he is directed to decision box 120 and asked whether he wishes to record crimped measurements with a second measuring device in the form of a digital or electronic caliper 42. If the operator answers "yes" to box 120, the program proceeds to a step 122 to calibrate the digital caliper 42. Calibration is performed by adjusting the digital caliper 42 to read "zero" when closed. If the operator answers "no", he is directed to input box 124 bypassing step 122. At input box 124, the operator enters measurements from crimped connector's 24 outer diameter into controller 14. Upon entering the preselected number of measurements, typically four, the operator is asked whether he wishes to accept the measurements, as indicated in a decision box 126. If the operator answers "no", he is returned to decision box 116. If the operator answers "yes", the measurements are entered into the memory of controller 14 for further internal processing which includes calculating a comparison of measured diameters with predetermined nominal diameters.

The operator is next presented with a decision box 130, which asks whether he wishes to adjust the nominal crimp diameter based upon the measured diameters. If "no", the operator is returned to input box 118. If the operator answers "yes" to decision box 130, the process proceeds to step 132 and the controller 14 self adjusts the vertical travel of pusher 18 in accordance with predetermined nominal diameter relationships programmed into the memory of controller 14 and corresponding to particular dies 22 and hose 26 types and sizes to maintain the crimped diameters within a predetermined tolerance, typically plus or minus 0.13 millimeters, of the nominal diameters. The operator is next returned to input box 118 and proceeds to repeat the above-described method of use.

In summary, connector 24 is crimped onto the end of hose 26 and the crimped connector diameter is automatically maintained within acceptable limits. This is done by inputting controller 14 of hose connector crimping apparatus 10 with the relative limit distance between first and second portions 16,18 of the clamping machine 12; assembling connector 24 and the hose end in the conical-shaped die 22 of the clamping machine 12 in preparation for crimping; and operating the clamping machine 12 so that the first and second portions 16,18 move towards each other thereby compressing the conical-shaped die 22, the compressing action being stopped in response to a signal from the linear potentiometer 40 which is operatively connected to the controller 14.

Other aspects and advantages of the present invention can be obtained from a study of the drawings, the disclosure and the appended claims.

We claim:

1. In an apparatus for crimping connectors on the ends of hoses, the apparatus including a clamping machine having first and second portions moveable relative to each other, a conical-shaped die holder on one of said portions, a conical-shaped split die mated with the die holder, means for moving said portions toward each other to cause relative movement of the die and die holder to move the die vertically and horizontally, the improvement comprising:

a first measuring device associated with the clamping machine for delivering a signal representative of the linear distance between the first and second portions, and a controller operatively connected to the first measuring device and the clamping machine, for receiving said signal and stopping the relative movement of the first and second moving portions of the clamping machine when the signal reaches a predetermined setting.

2. The apparatus as set forth in claim 1 wherein a second measuring device operatively connected to the controller reports measured connector diameters to the controller.

3. The apparatus as set forth in claim 2 wherein said second measuring device is a digital caliper.

4. The apparatus as set forth in claim 2 wherein a foot pedal device signals said controller to record an output signal from said second measuring device.

5. The apparatus as set forth in claim 1 wherein measured connector diameters are compared to a database of predetermined nominal connector diameters.

6. The apparatus as set forth in claim 5 wherein the controller adjusts relative movement of the first and second portions based upon a comparison of the measured connector diameters and the database of predetermined nominal connector diameters.

7. The apparatus as set forth in claim 1 wherein said first measuring device is a linear potentiometer.

8. The apparatus as set forth in claim 1, wherein the controller has a menu-driven set of operator communications.

9. A method for crimping a connector onto a hose end whereby the crimped connector diameter is maintained within acceptable limits, comprising the steps of:

inputting a controller of a hose connector crimping apparatus with a relative limit distance between first and second portions of a clamping machine;

assembling a connector and a hose end in a conical-shaped die supported on one of the first and second portions in preparation for crimping the connector upon the hose end; and operating the clamping machine so that said first and second portions move towards each other thereby compressing the conical-shaped die, the compressing action being stopped in response to a signal from a first measuring device operatively connected to the controller.

10. The method as set forth in claim 9, further comprising the steps of measuring the diameter of the crimped connector and inputting the same into the controller;

comparing the diameter of the crimped connector to a database of acceptable crimped diameters, said database being classified by hose type and size and stored with the controller, and automatically adjusting the limit distance of the first and second portions in the controller in response to the comparison of the diameter of the crimped connector and the database of acceptable crimped diameters.

* * * * *